United States Patent
Faitelson et al.

(10) Patent No.: US 10,242,110 B2
(45) Date of Patent: Mar. 26, 2019

(54) FILTERING OF SEARCH RESULTS ACCORDING TO ACCESS PERMISSION

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, LTD, Herzliya (IL)

(*) Notice: Subject to any disclaimer, the term of this patent is extended or adjusted under 35 U.S.C. 154(b) by 375 days.

(21) Appl. No.: 15/011,691

(22) Filed: Feb. 1, 2016

(65) Prior Publication Data
US 2017/0220686 A1    Aug. 3, 2017

(51) Int. Cl.
G06F 17/30    (2006.01)

(52) U.S. Cl.
CPC ............................. *G06F 17/30867* (2013.01)

(58) Field of Classification Search
CPC .......... G06F 17/30867; G06F 17/3053; G06F 17/30321; G06F 17/30528; G06F 17/30554; G06F 21/6218; G06F 17/30; G06F 17/30563; G06F 17/321; G06F 17/30477; G06F 17/30336; G06F 17/30377; Y02P 90/18
See application file for complete search history.

(56) References Cited

U.S. PATENT DOCUMENTS

| | | | | |
|---|---|---|---|---|
| 9,195,759 | B2* | 11/2015 | Faitelson | G06F 21/6218 707/E17.001 |
| 9,734,212 | B2* | 8/2017 | Faitelson | G06F 17/3053 707/E17.008 |
| 2008/0033954 | A1 | 2/2008 | Brooks | |
| 2008/0082540 | A1* | 4/2008 | Weissman | G06F 21/6227 707/E17.001 |
| 2010/0262624 | A1* | 10/2010 | Pullikottil | G06F 17/30336 707/783 |
| 2011/0295839 | A1* | 12/2011 | Collins | G06F 17/30463 707/716 |
| 2012/0143817 | A1* | 6/2012 | Prabaker | G06F 17/30165 707/608 |
| 2012/0259722 | A1* | 10/2012 | Mikurak | G06Q 10/087 705/26.1 |
| 2013/0031487 | A1* | 1/2013 | Olsen | G06Q 50/01 715/751 |
| 2013/0086700 | A1* | 4/2013 | Cho | H04L 67/303 726/36 |
| 2013/0263221 | A1* | 10/2013 | Faitelson | G06F 21/6218 707/741 |

(Continued)

*Primary Examiner* — Anh Ly
(74) *Attorney, Agent, or Firm* — Soroker Agmon Nordman

(57) ABSTRACT

A method for filtering-out results of a search, comprising obtaining representations of objects of a computerized system identified in the computerized system in a search conducted in the a computerized system by a party, and responsive to the search, applying by the computerized system an at least one condition constructed in the computerized system and related to access of the party with respect to the objects, thereby filtering-out the representations of the objects that correspondingly comply with the at least one condition, and an apparatus configured to carry out the method.

15 Claims, 4 Drawing Sheets

(56) References Cited

U.S. PATENT DOCUMENTS

2015/0379031 A1* 12/2015 Banatwala ........ G06F 17/30864
707/785
2016/0055163 A1* 2/2016 Faitelson ............ G06F 21/6218
707/723

* cited by examiner

Prior Art

FILTERING OF SEARCH RESULTS ACCORDING TO ACCESS PERMISSION

BACKGROUND

The present disclosure generally relates to search results, and more specifically to filtering of the search results.

Search results of files or other data objects obtained by using cotemporary tools such as Google (Google Inc.) or Bing (Microsoft Corp.) are provided regardless of access permissions of the searcher with respect to the results.

In some cases, some data objects might be accessed up to a stage where confidentially credentials such as registration or permissions might be required. Generally, the confidentially credentials, however, do not pertain to the search results, but, rather, to some extraneous considerations such as registrations or payments.

SUMMARY

One exemplary embodiment of the disclosed subject matter is a method for filtering-out results of a search, comprising obtaining representations of objects of a computerized system identified in the computerized system in a search conducted in the a computerized system by a party, and responsive to the search, applying by the computerized system an at least one condition constructed in the computerized system and related to access of the party with respect to the objects, thereby filtering-out the representations of the objects that correspondingly comply with the at least one condition.

Another exemplary embodiment of the disclosed subject matter is an apparatus configured to carry out the method disclosed hereinabove.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
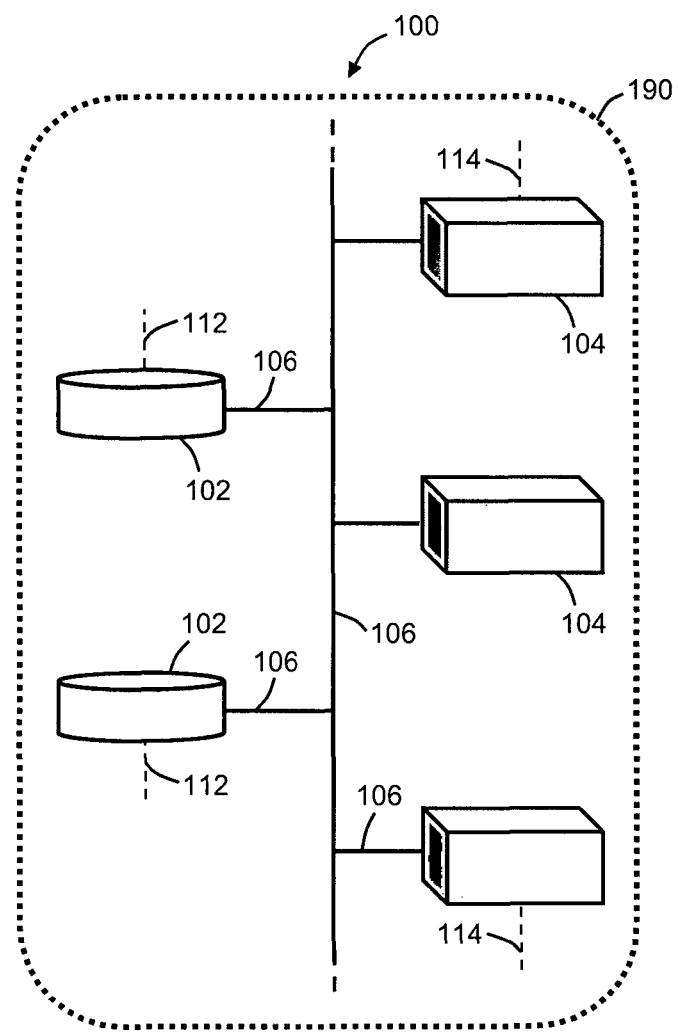

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2A:
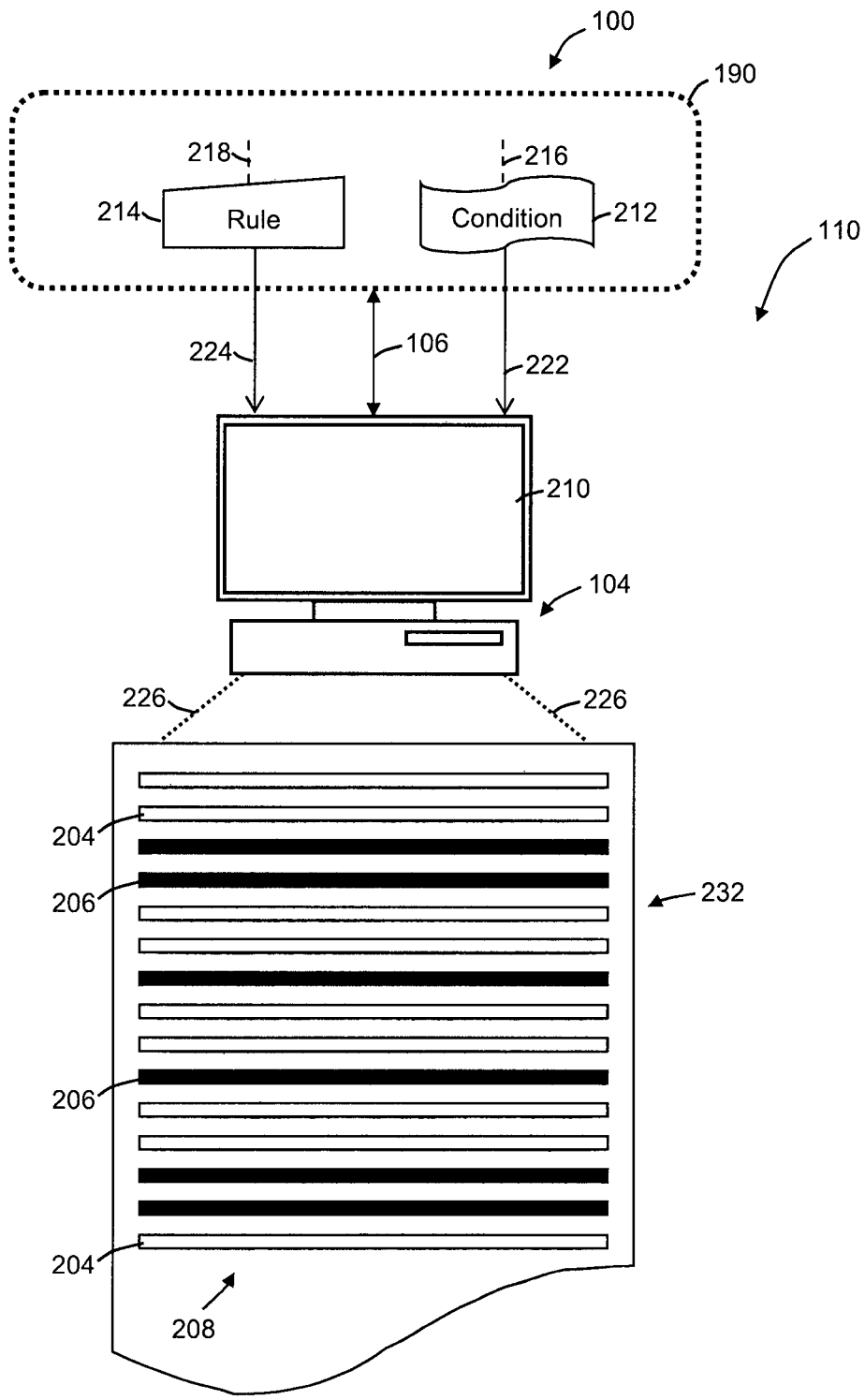
Figure 2B:
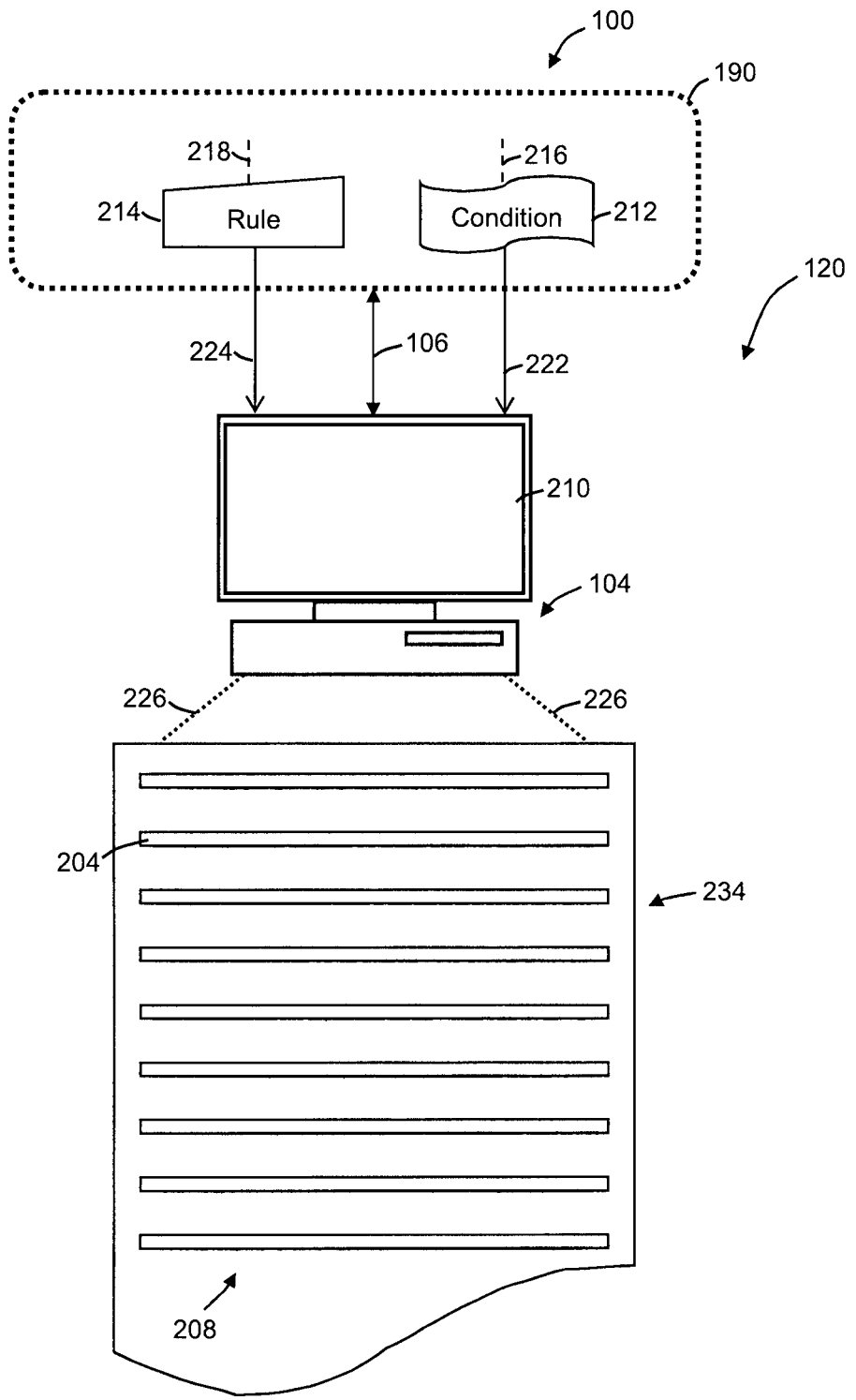
Figure 3:
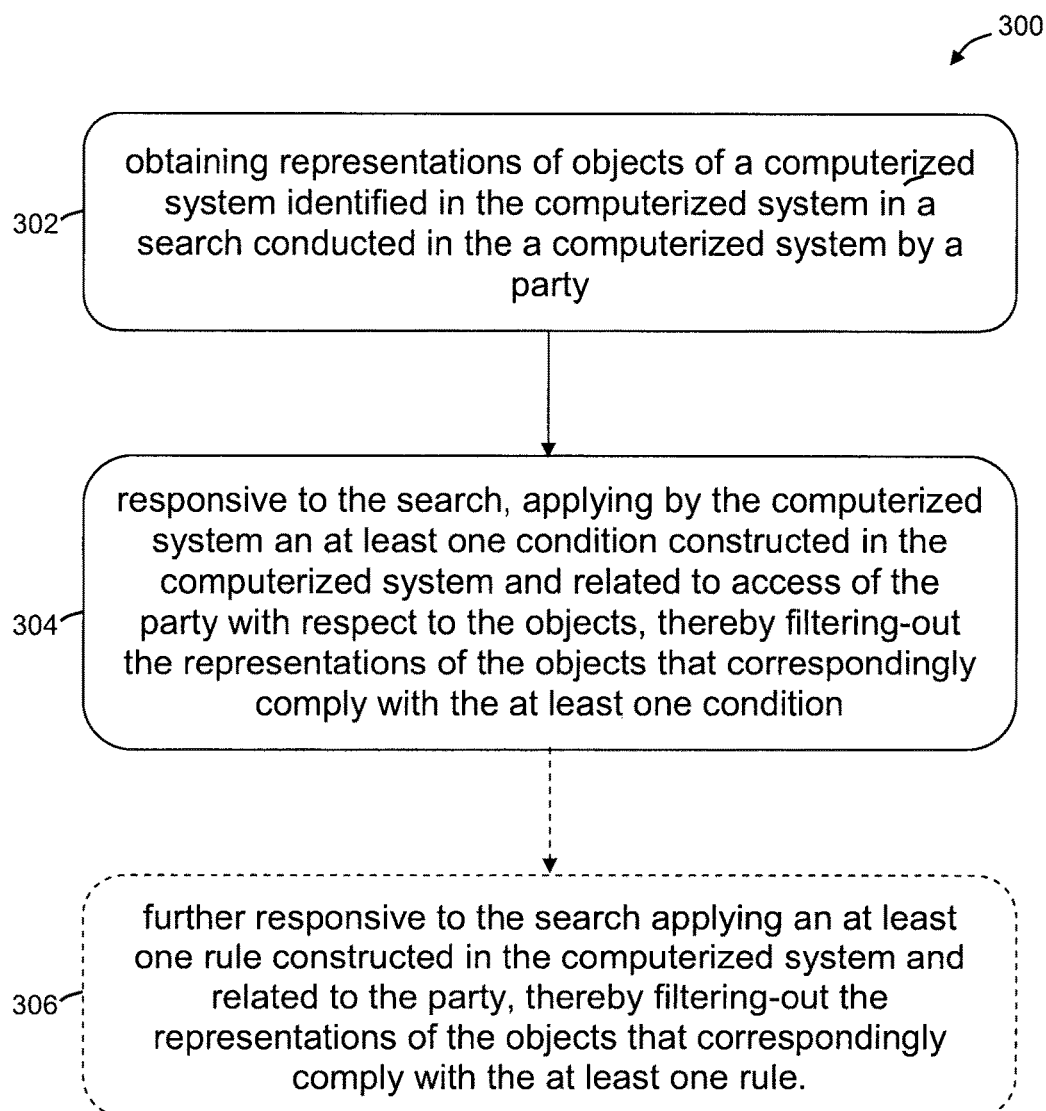

FIG. 1 schematically illustrates a computerized system of an enterprise, illustrated as three computers representing any number of computers, according to exemplary embodiments of the disclosed subject matter;

FIG. 2A schematically illustrates, according to exemplary embodiments of the disclosed subject matter, an arrangement of the computerized system with an instance of a computer connected to computerized system, with an array of representations of objects of the computerized system found in a conducted search in the instance of the computer;

FIG. 2B schematically illustrates, according to exemplary embodiments of the disclosed subject matter, an arrangement of the computerized system with an instance of a computer connected to computerized system, with an array of representations of objects of the computerized system found in a conducted search in the instance of the computer that are accessible to the party; and FIG. 3 outlines operations in filtering-out results of a search, according to exemplary embodiments of the disclosed subject matter.

DETAILED DESCRIPTION

In the context of the present disclosure, without limiting, the term 'computerized system' implies a system comprising a plurality of computing apparatuses, such as computers, communicating therebetween and having and/or sharing and/or communicating with at least one data storage device. The data storage device is also referred to as 'data storage' or 'storage'.

For brevity, referring to an operation of and/or by a computerized system implies an operation of and/or by one or more components and/or of the computerized system, such as by one or more computers of the computerized system. Likewise, for brevity, referring to an entity constructed or stored in a computerized system implies, respectively, constructed in a component of the computerized system such as by one or more computers of the computerized system or stored in at least one of the data storage of the computerized system.

Generally, without limiting, a computerized system comprises several computers in a range between about 10 computers to about 1000 computers or more. Optionally, a computerized system comprises less than 10 computers, not precluding having one computer as, for example, a mainframe computer.

In the context of the present disclosure, without limiting, the term 'object' implies a data element of a computerized system, such as a folder, a file or a database.

In the context of the present disclosure, without limiting, the term 'party' implies a user of a computerized system and/or a person operating an apparatus connectable to the computerized system, and/or an individual and/or a program operating on behalf of the party.

In the context of the present disclosure, without limiting, the terms 'permissions' or 'rights' with respect to an object and/or to a party with relation to the object imply one or more attributes of the computerized system and/or the object according to which accessing the object is allowed or denied.

In the context of the present disclosure, without limiting, the term 'classification' refers to categorization or characterization of objects according to one or more classes according to the nature of objects with respect to the computerized system. For example objects that include confidential or sensitive content of the computerized system are classified as 'sensitive' whereas objects with neutral or impartial content may'be classified as 'public'. Object may be classified, at least partially, by a plurality of classifications. For example, some objects belonging to management may be classified both as 'management' and 'sensitive'. Classification of objects may be determined automatically such as according to the contents thereof, and/or manually such as by an authorized party for that effect, for example by IT personnel. Non-limiting examples of objects classified as 'sensitive' might be objects that hold credit cards numbers, financial data or business accounts of the computerized system.

Generally, without limiting, the one or more data storage devices store a large number of data objects that may be in the order of $10^5$-$10^6$ or higher. The large amount of the data objects calls for suitable management measures by the computerized system regarding operations with and/or on the data objects such as with respect to security, confidentiality, permissions, privileges, restrictions and so forth.

Generally, in the context of the present disclosure the computerized system belongs and/or is a part of an organization, such as a business, department of a government or institution or an association.

In the context of the present disclosure, without limiting, the terms 'representation' with respect to an object denotes a graphical and/or textual display, such as an icon and/or name of the object. The representation is constructed for accessing the object, such as by a link thereto, and accessing the object may be carried out such as by activating the representation, for example by a double click with a mouse or a finger in case of a touch screen or and/or by any technique such as selecting and pressing a key such as 'Enter'. The access to the object is possibly subject to provisions or constraints of the computerized system such as by permissions.

For brevity and fluency of the description below, an object represented by a representation is also referred to as an object corresponding or respective to the representation, and referring to a representation or an object is also referred to as a representation corresponding or respective to the object.

In the context of the present disclosure, without limiting, referring to an owner of an object implies a party owning such as by creating the object and/or a party authorized to control the object.

The terms cited above denote also inflections and conjugates thereof.

One technical problem dealt by the disclosed subject matter is controlling access to objects of a computerized system obtained as results in a search conducted in the computerized system by a party.

One technical solution according to the disclosed subject matter is filtering-out results of the conducted search according to conditions related to access of the party with respect to the results, where filtering-out includes at least one of excluding or hiding or inactivating or distinctly indicating the results that meet the conditions.

One exemplary condition relates to general indistinctive and/or global permissions such as public access permissions, collectively referred to as global permissions. Thus, results of the conducted search that meet the condition are filtered-out. For example results pertaining to objects that belong to a group or stored in folder having global permission are filtered-out. In some embodiments, the global permissions are subject to classification and/or any designation of the objects. For example only results of objects having global permissions that are classified and/or designated as sensitive or confidential are filtered-out.

Another exemplary condition relates to results of objects that belong to a cluster of objects of the computerized system categorized according to similarity of access by a user to the objects, or lack thereof. Thus, results of the conducted search pertaining to objects that meet a condition of belonging to a cluster that a user never accessed so far are filtered-out.

In some embodiments, further to the conditions the results may be acted upon by rules related to objects and/or users of the computerized system, thereby filtering-out results. For example, according to a rule results may be filtered-out based on history of access of users, or based on certain attributes or metadata of objects.

Optionally or additionally, a condition and/or a rule are based on settings or configurations of the computerized system. For example, settings that a condition or a rule is applicable only for certain dates or times, or that a condition or a rule is applied based on a certain schedule.

In some embodiments conditions and rules may be interchanged and/or derived from each other.

In some embodiments, the search is conducted by a user of the computerized system. Optionally or additionally, the search may be conducted by a party via a computer linked to the computerized system.

It is noted that results of objects are generally not the objects per se, but, rather, representations of the objects that may be activated to access the objects. For example strings and/or icons that embed links to the objects.

It is further noted that referring to a single element does not precluded a plurality of elements, for instance, referring to a condition does not preclude a plurality of conditions; vise versa, referring to a plurality of elements does not preclude a single element, for instance, referring to rules does not preclude a single rule.

A potential technical effect of the disclosed subject matter is a computerized system that provides for secure access to results of searches conduced in the computerized system.

A general non-limiting overview of practicing the present disclosure is presented below. The overview outlines exemplary practice of embodiments of the present disclosure, providing a constructive basis for variant and/or alternative and/or divergent embodiments.

FIG. 1 schematically illustrates, according to exemplary embodiments of the disclosed subject matter, a computerized system 100 represented schematically by a dotted frame 190, and illustrated as three instances of a computer 104, representing any number of computer 104, as indicated by dashed lines 114.

Computerized system 100 further comprises one or more data storage devices, illustrated as two instances of a data storage device 102, representing any number of data storage device 102, as indicated by dashed lines 112. Data storage device 102 generally stores objects or data entities such as files, folders, database records or users definitions or similar elements, collectively referred to also as objects. Data storage device 102 optionally stored an index or part thereof of the objects and/or metadata of the objects.

The instances of computer 104 are connected, linked, or coupled therebetween and to the instances of data storage device 102, the connection or linkage illustrated and represented by a network 106.

Computerized system 100 is also configured to exchange data with devices external to computerized system 100 by communications facilities comprised in the devices.

Generally, computerized system 100 and/or parts thereof are operable by one or more programs installed such as in instances of computer 104. For brevity, the one or more programs are also referred to as system software.

FIG. 2A schematically illustrates, according to exemplary embodiments of the disclosed subject matter, an arrangement 110 of computerized system 100 with an instance of computer 104 connected to computerized system 100 via network 106, with an array 232 of representations of objects of computerized system 100 found in a search conducted in computer 104. For brevity, the instance of computer 104 is also referred to as computer 104.

It is noted that computer 104 may be also a computer external to computerized system 100 and linked to computerized system 100 by suitable communication facilities.

By way of example, a party uses computer 104 to conduct a search for objects of computerized system 100 such as by keywords or terms. The results of the search as representations of the found or identified objects, denoted also as results 208, are presented on a display 210 of computer 104. Display 210 is, for example, a separate display device or an integrated display apparatus such as in notebook computers or mobile smartphones, and is shown for clarity in an expanded view according to a pair of a dotted line 226.

In some embodiments a condition, denoted as a condition 212, which relates to permissions and/or activity and/or other characteristic of the party with respect to objects of computerized system 100 is constructed in computerized system 100. Condition 212 may comprise a plurality of such conditions, as indicated by a dashed line 216.

Optionally or additionally, in computerized system 100 is constructed a rule, denoted as a rule 214, that relates to attributes and/or properties of objects of computerized system 100. Rule 214 may comprise a plurality of such rules, as indicated by a dashed line 218.

In some embodiments or cases, only condition 212 is constructed in computerized system 100; optionally, only rule 214 is constructed in computerized system 100 without condition 212; further optionally, both condition 212 and rule 214 are constructed in computerized system 100.

Computerized system 100 is configured, such as by a suitable program or other software, to activate and apply condition 212 and/or rule 214 responsive to a conducted search, such as by reacting or responding to an event generated by the search. In some embodiments, condition 212 and/or rule 214 are applied according to a timing procedure such as by a schedule or within a certain day/time range. Generally, without limiting, condition 212 and/or rule 214 are applied by a suitable program or software of computerized system 100 coupled to condition 212 and/or rule 214 and/or otherwise associated with condition 212 and/or rule 214, collectively referred to as associated program respective of condition 212 and/or rule 214.

Thus, responsive to the conducted search, in case condition 212 is constructed then condition 212 is applied on results 208 as schematically illustrated by an arrow 222, and, responsively, some of results 208 may or are designated as inaccessible to the party; similarly, in case rule 214 is constructed then rule 214 is applied on results 208, as schematically illustrated by an arrow 224, and, responsively, some of results 208 may or are designated as inaccessible to the party.

Accordingly, some of results 208 that are designated as inaccessible to the party are schematically illustrated in black, such as representation 206, and some of results 208 that are designated as accessible to the party are schematically illustrated in white, such as representation 204.

In some embodiments representations of all of results 208 are presented on display 210, where the representations of the inaccessible objects are suitably marked such a by a color that differentiate the representations of the inaccessible objects from the representations of accessible objects. It is noted that the representations of the inaccessible objects are cannot be activated to access the respective object, or, optionally might be activated but access to the respective object is prevented.

Alternatively, in some embodiments, the representations of the inaccessible objects are not displayed, that is, the representations are eliminated or discarded, as further illustrated.

FIG. 2B schematically illustrates, according to exemplary embodiments of the disclosed subject matter, an arrangement 120 of computerized system 100 with an instance of computer 104 connected to computerized system 100 via network 106, as described above, with an array 234 of representations of objects of computerized system 100 found in a search conducted by a party in computer 104 that are accessible to the party.

Thus, unlike arrangement 232, representations of objects that are inaccessible to the party are absent in array 234, leaving only the representations of objects that are accessible to the party.

It is noted that representations of objects, such as representation 204, might be activated to access the respective object, though access to the respective object might eventually be prevented due to provisions or constraints of computerized system 100 that are unrelated to condition 212 and/or rule 214. For example, in case the respective object is already used by another party or in case collaboration with the respective object is not allowed.

It is further noted that, in some cases, depending on the objects and/or search terms, results 208 in array 232 and/or array 234 may amount to one representation, either as one representation 204 and/or one representation 206, and optionally none thereof.

Filtering-out of representations of object may be carried out such as by preventing access and/or coloring and/or discarding and/or hiding the representations of the objects.

In some embodiments, when and/or responsive to generation or forming of representations of objects that are inaccessible to the party a notification or alert to that effect is presented, optionally accompanied with the number of such representations. Optionally, however, representations of objects that are inaccessible to the party are not presented.

In some embodiments, access right or permission to access objects respective to presentations of objects found in a search that are inaccessible to the party may be requested from respective owners of the objects. For example a request to access an object may be generated by performing an operation on a representation, such as by a right-click by a mouse or a triple click on a touch screen on the representation. Responsively, according to contact data maintained in the computerized system such as computerized system 100, the owner of the object may be notified that access to the party is requested.

The owner may grant access to the party, for example, by email or SMS or IM or otherwise to allow the party to access the objects possibly providing business or technical date enabling the access such as links or URLs. Optionally or alternatively, the owner or a program or other functionalities on behalf of the owner set permission for the party in the computerized system and/or the object. Optionally, access is granted under some restrictions or constraints such as boundaries of time or dates when access is allowed. Alternatively, the owner may not grant access permission for the object to the party, optionally notifying the party for the reasons for refusing to grant the access.

For brevity, however, in the following descriptions without limiting and unless otherwise specified, discarding of representations stands for any form of filtering-out of representations of objects found in a conduced search.

The conditions may be constructed or formed in any suitable structure and are applied responsive to conducting a search by a party.

In some embodiments, a condition may be constructed as a procedure or sequence of instructions such as in a form of if-then-else.

For clarity and brevity, in regard to conditions below, when objects are referred to then the objects corresponding to the representations are implied.

By way of example, a condition regarding the representations of objects found in the search is constructed and formed as procedure (1) below.

(1) If the objects are in a folder having global permissions then discard the representations.

By way of another example, a condition regarding the representations of objects found in the search is constructed and formed as procedure (2) below.

(2) If the objects belong to cluster where the objects in the cluster were not yet accessed by the party then discard the representations.

A condition may also be formed in a tabular manner. Another form of the condition according to procedure (1) is exemplified in a tabular manner in Table-1 below.

TABLE 1

| Assemblage | Attribute | Property | Discard |
|---|---|---|---|
| Folder | Permission | Global | Yes |

The Assemblage refers to the collection of the objects, the Attribute refers to the permissions, the Property refers to the type of the attribute and the Discard indicates whether the representations are to be discarded. Thus, if the objects are in a folder having global permissions then the representations are discarded.

As another form of the condition according to procedure (2) in a tabular manner is exemplified in Table-2 below.

TABLE 2

| Assemblage | Attribute | Property | Discard |
|---|---|---|---|
| Cluster | Usage by party | No | Yes |

The Assemblage refers to the cluster of the objects, the Attribute refers to the usage by the party, and the Property refers to whether the objects were used by the party and the Discard indicates whether the representations are to be discarded. Thus, if the objects belong to a cluster and were not used by the party then the representations are discarded.

The conditions of Table-1 and Table-2, and thus, likewise, of procedure (1) and procedure (2), respectively, may be combined as depicted in Table-3 below. Likewise, procedure (1) and procedure (2) may be concatenated or combined.

TABLE 3

| Assemblage | Attribute | Property | Discard |
|---|---|---|---|
| Folder | Permission | Global | Yes |
| Cluster | Usage by party | No | Yes |

The conditions may be elaborate or more detailed. Thus, based on the condition of Table-1 another condition may be formed in a tabular manner as exemplified in Table-4 and Table-5 below, where properties of the objects as classification thereof are taken into account.

TABLE 4

| Assemblage | Attribute | Property | Classification | Discard |
|---|---|---|---|---|
| Folder | Permission | Global | Sensitive | Yes |

TABLE 5

| Assemblage | Attribute | Property | Classification | Discard |
|---|---|---|---|---|
| Folder | Permission | Global | Public | No |

Thus, representations of objects found in the search would be discarded when the objects and/or folder the objects belong to are classified as 'sensitive'. Likewise, procedure (1) may be elaborated as according to Table-4, as, for example, procedure (3) below.

(3) If the objects are in a folder having global permissions which is classified as 'sensitive' then discard the representations.

The rules may be constructed or formed in any suitable structure and are applied responsive to conducting a search by a party.

In some embodiments, a rule may be constructed as a procedure or sequence of instructions such as in a form of if-then-else.

By way of example, a rule regarding the representations of objects found in the search is constructed and formed as procedure (4) below.

(4) If the party belongs to a group classified as 'IT' then discard the representations.

A rule may also be constructed in a tabular manner. Thus, akin to procedure (4) the rule may be constructed as in Table-6 below.

TABLE 6

| Classification | Discard |
|---|---|
| not IT | Yes |

Similarly, the rule may be constructed in a more elaborate for as exemplified in Table-7 below.

TABLE 7

| Classification | Object Attribute | Discard |
|---|---|---|
| not IT | Read-Only | No |

Thus, according to Table-7 the rule may be constructed procedurally as exemplified in procedure (5) below.

(5) If the party does not belong to a group classified as 'IT' and the objects represented by the representations are not Read-Only then discard the representations.

For clarity and brevity, in regard to conditions and rules below, when objects are referred to then the objects corresponding to the representations are implied.

Principally, at least in some embodiments, the order of applying the conditions and rules, if any is present, is immaterial. Yet, however, in some embodiments one or more conditions and/or one or more rules may have precedence over the other, such as for resolving possible conflicts therebetween. Likewise, in some embodiments, precedence of conditions and/or rules may be established.

In some embodiments the conditions and rules may be combined. By way of example, the conditions represented by Table-1 and the rule represented by Table-6 may be combined as exemplified in Table-8 below.

TABLE 8

| Assemblage | Attribute | Property | Classification | Discard |
|---|---|---|---|---|
| Folder | Permission | Global | IT | Yes |

Accordingly, the condition and rule may be combined in any suitable form such a procedure.

According to the nature of the conditions and rules, at least in some embodiments the conditions and rules are handled and/or constructed similarly and/or combined. Thus, a condition may be derived from a rule and vice versa. In some embodiments the difference between rules and conditions is the precedence therebetween, for example, where rules are applied after the conditions to augment or revise the filtering-out by the conditions. Evidently, representations that are already filtered-out are not further filtered-out or redundantly filtered-out.

The rules and/or conditions are set in the computerized system, such as by an administrator or by IT personnel and stored in a suitable storage of the computerized system. The rules and/or conditions may be modified during the course of operation of the computerized system, such as due to or responsive to changes of objects and/or settings in the computerized system.

The rules and/or conditions are applied responsive to the conducted search by the computerized system such as by one or more of components thereof, for example, by one or more of computers of the computerized system and/or computer or computers linked thereto.

In some embodiments, the conditions and/or rules are applied according to timing regime or policy of the computerized system. For example, the conditions and/or rules are not applied in weekends, or the conditions and/or rules are applied according to a schedule.

In some embodiments, the conditions and/or rules or scope thereof differs between groups of users of the computerized system. For example, searches conducted by parties belonging to a group of Administrators are subject to different conditions and/or rules than searches conducted by parties belonging to a group of Human Resources.

FIG. 3 outlines operations 300 in filtering-out results of a search, according to exemplary embodiments of the disclosed subject matter.

In operation 302 representations of objects of a computerized system identified in the computerized system in a search conducted in the computerized system by a party are obtained.

The search may include any search method, generally without limiting, according to text phrases in the objects and/or in metadata of the objects such as in names or attributes thereof.

Generally, without limiting, the representations are presented on or by a display device such as an LCD screen.

In some embodiments or cases, such as depending on the search and the objects of the computerized system, the representations constitute one representation of one object.

In some embodiments, the at least one conditions comprises a plurality of conditions.

In operation 304 responsive to the search, an at least one condition constructed in the computerized system and related to access of the party with respect to the objects is applied by the computerized system, thereby filtering-out the representations of the objects that correspondingly comply with the at least one condition.

In some embodiments, the filtering-out implies rendering the representations as inaccessible to the party, such as disabling activation of the representations. In some embodiments, the filtering-out implies discarding the representations or hiding the representations.

In operation 306, optionally at least, responsive to the search an at least one rule constructed in the computerized system and related to the party is further applied, thereby filtering-out the representations of the objects that correspondingly comply with the at least one rule. Thus, representations that were not yet filtered-out are filtered-out accordingly.

In some embodiments, the at least one rule comprises a plurality of rules.

In some embodiments a condition and a rule may be combined and/or derived from each other.

To clarify, referring to objects that correspondingly comply with the at least one condition and/or the at least one rule imply objects corresponding to the representations, respectively.

There is thus provided according to the present disclosure a method for filtering-out results of a search, comprising obtaining representations of objects of a computerized system identified in the computerized system in a search conducted in the a computerized system by a party, and responsive to the search, applying by the computerized system an at least one condition constructed in the computerized system and related to access of the party with respect to the objects, thereby filtering-out the representations of the objects that correspondingly comply with the at least one condition.

In some embodiments, the at least one condition relates to permissions of the party with respect to the objects.

In some embodiments, the at least one condition relates to access history of the party with respect to the objects.

In some embodiments, further responsive to the search, applying an at least one rule constructed in the computerized system and related to the party, thereby filtering-out the representations of the objects that correspondingly comply with the at least one rule.

In some embodiments filtering-out the representations of the objects according to the at least one condition comprises rendering the representations as inaccessible to the party.

In some embodiments, filtering-out the representations of the objects according to the at least one rule comprises rendering the representations as inaccessible to the party.

In some embodiments, filtering-out the representations of the objects according to the at least one condition comprises discarding the representations of the objects.

In some embodiments, filtering-out the representations of the objects according to the at least one rule comprises discarding the representations of the objects.

In some embodiments, the at least one condition and the at least one rule are interchangeable.

In some embodiments, the at least one condition and the at least one rule are combined.

In some embodiments, the at least one condition is derived from the at least one rule.

In some embodiments, the at least one rule is derived from the at least one condition.

In some embodiments, the representations of the objects include one representation of one object.

In some embodiments, the at least one condition comprises a plurality of conditions.

In some embodiments, the at least one rule comprises a plurality of rules.

In some embodiments, the representations of the objects are presented on a display device.

There is thus further provided according to the present disclosure a computerized system configured to carry out the method described above.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for filtering-out results of a search, comprising:
    in a computerized system, comprising a processor, and a storage, obtaining by the processor representations of objects of the computerized system for activation by a party to access the objects that were identified in a search conducted in the storage of the computerized system by the party;
    responsive to the search, applying by the processor an at least one condition constructed in the computerized system and related to access of the party with respect to the objects, thereby filtering-out the representations of the objects that correspondingly comply with the at least one condition by rendering the representations of the objects as inaccessible to the party by disabling activation of, the representations of the objects;
    displaying by the processor, the filtered representations of the objects on a display for activation by the party so as to access the objects identified in the search; and
    in response to performing an operation on the representations of the objects displayed on the display that were found in the search to be inaccessible to the party, generating by the processor an access request to owners of the inaccessible objects using contact data of the owners maintained in the computerized system, and discarding the inaccessible representations of the objects if the owners do not grant access to the party,
    wherein if the objects are in a folder having global permissions, discarding by the processor the representations of the objects.

2. The method according to claim 1, wherein the at least one condition relates to permissions of the party with respect to the objects.

3. The method according to claim 1, wherein the at least one condition relates to access history of the party with respect to the objects.

4. The method according to claim 1, wherein further responsive to the search applying an at least one rule constructed in the computerized system and related to the party, thereby filtering-out the representations of the objects that correspondingly comply with the at least one rule.

5. The method according to claim 4, wherein filtering-out the representations of the objects according to the at least one rule comprises rendering the representations as inaccessible to the party.

6. The method according to claim 4, wherein filtering-out the representations of the objects according to the at least one rule comprises discarding the representations of the objects.

7. The method according to claim 4, wherein the at least one condition and the at least one rule are interchangeable.

8. The method according to claim 4, wherein the at least one condition and the at least one rule are combined.

9. The method according to claim 4, wherein the at least one condition is derived from the at least one rule.

10. The method according to claim 4, wherein the at least one rule is derived from the at least one condition.

11. The method according to claim 4, wherein the at least one rule comprises a plurality of rules.

12. The method according to claim 1, wherein filtering-out the representations of the objects according to the at least one condition comprises discarding the representations of the objects.

13. The method according to claim 1, wherein the representations of the objects include one representation of one object.

14. The method according to claim 1, wherein the at least one condition comprises a plurality of conditions.

15. The method according to claim 1, wherein the representations of the objects are presented on a display device.

* * * * *